United States Patent Office 3,170,798
Patented Feb. 23, 1965

3,170,798
INTERESTERIFICATION PROCESS
Johan Burgers, Springfield Township, Hamilton County, and Charles Woolsey Motl, Wyoming, Ohio, and Paul Seiden, Hamilton, Ontario, Canada, assignors to The Procter & Gamble Company, Cincinnati, Ohio, a corporation of Ohio
No Drawing. Filed Nov. 22, 1961, Ser. No. 154,337
2 Claims. (Cl. 99—118)

This invention relates to the interesterification of fatty materials. More particularly, it relates to an improved process for the randomization or random rearrangement of glyceride esters.

Molecular rearrangement or interesterification is an important process in the modification of glyceride esters. In many fats the maximum usage is limited by undesirable crystalline forms which develop as the result of the presence in the fats of one or more specific glycerides in an amount which is appreciably higher than could be predicted if the fatty acids were randomly distributed in the glyceride molecules. An example is lard which contains a large amount of glycerides in which oleic, palmitic and stearic acids are present in the 1, 2, and 3 positions respectively. Such glycerides give the lard a grainy character when it is used alone or in combination with other fats in a shortening. A rearrangement of the fatty acids to a random distribution on the glycerine radicals in lard will overcome these undesirable properties.

In oils used for the manufacture of margarine the randomization of a mixture of oils will, in general, decrease the amount of higher trisaturates, thus improving eating quality. A particular improvement is noted in mixtures of coconut oil with many hard or hardened fats which show a sharp decrease in solids content between 70° and 80° F. when blended. Randomization of these blends will eliminate the intersolubility effect and form a product which is firm at refrigerator and room temperatures, but will melt in the mouth when eaten.

Randomization processes are frequently carried out by heating fatty materials in the presence of an alkali metal catalyst such as an alkali metal hydroxide. Upon completion of the rearrangement reaction it is necessary to inactivate the catalyst. This is usually accomplished by adding water which forms alkali metal hydroxide solution which tends to react with glycerides to form soap. Most of the soaps will separate in the water phase which has been formed. However, the soap will entrain neutral fat, which results in a considerable loss of product.

It has now been found that by the practice of this invention the amount of alkali metal hydroxide catalyst necessary for the randomization process can be greatly reduced, resulting in a consequent reduction in loss of product upon removal of the catalyst when the randomization reaction is completed.

Accordingly, it is an object of this invention to provide an improved process for the randomization of fatty esters.

Another object is to provide a process in which the loss accompanying alkali metal hydroxide catalyst usage is greatly reduced.

Other objects and advantageous features will be apparent from the following detailed description.

In general, the invention comprises the rearrangement of fatty esters by dispersing in the ester from about 0.02% to 0.08%, by weight, of alkali metal hydroxide in the form of an aqueous solution containing from 1% to 12% hydroxide, and from about 0.10% to 0.30% glycerine, while maintaining said esters at a temperature high enough to melt all solids present but not greater than about 160° C. The esters are then maintained at a temperature within the range of 120° C. to 200° C. until there has been substantial rearrangement of said esters. The catalyst present in the rearranged esters is destroyed by adding an edible acidic material, capable of neutralizing alkali metal soaps, in an amount equal to 1 to 5 equivalents of the alkali metal hydroxide dispersed in the fatty esters prior to reaction. The oil-insoluble material thereby formed is removed from the product, and any free fatty acids are also removed from the product. At lower temperatures within the above ranges it will be desirable to conduct the reaction at reduced pressure to remove water and render the catalyst active, and also to protect the oil.

Fatty esters suitable for rearrangement by the process of this invention include natural vegetable, animal, and marine glyceride oils and fats, and also synthetic triglycerides including those containing both long and short chain fatty acids. Mixtures of fats can also be treated, and the fatty materials can be hydrogenated prior to randomization. The esters should contain not more than 0.1% free fatty acid, and if the free fatty acid content is greater than this amount it can be removed prior to randomization by known methods. A novel method of accomplishing this will be described hereinafter.

Sodium hydroxide is the preferred alkali metal hydroxide for use in the practice of this invention, since it is most economical, but potassium and lithium hydroxides are equally effective in their activities. At least 0.02% by weight hydroxide is required for effective catalytic action, but more than about 0.08% will result in too large a loss of product when the catalyst is subsequently removed.

The hydroxide must be added in the form of an aqueous solution. A concentration of solution less than 1% will be uneconomical due to the large amount of water which must be removed prior to the beginning of the randomization reaction. If the concentration is greater than 12% it will only be possible to obtain an effective dispersion of the catalyst present by employing extensive mechanical means for agitation such as high-shear agitation. Mild agitation may be desirable to promote the dispersion of the hydroxide in the present invention.

The presence of free glycerine is necessary for the randomization reaction of this invention. Although the hydroxide can provide free glycerine through saponification of fat in the reaction mixture, it will be necessary to increase the amount of catalyst used, and this will result in greater loss upon catalyst removal. Accordingly, at least about 0.10%, by weight, free glycerine should be added to the reaction mixture. If too much glycerine is added, too many monoglycerides and diglycerides will be formed during the randomization and consequently it is desirable to add not more than about 0.30% glycerine.

In order to facilitate dispersion of the catalyst and glycerine, the fatty esters should be heated to a temperature at which all solids will be melted. However, if the temperature is greater than about 160° C., the glycerine will flash off when reduced pressures are used.

Water present in the reaction mixture must be driven off before the randomization reaction will take place. Accordingly, the mixture should be maintained at a temperature not less than 120° C. during reaction. Reaction temperatures higher than about 200° C. are undesirable since glycerine may boil off when operating at reduced pressures. At lower temperatures within the above range it will be desirable to conduct the reaction at reduced pressure.

After completion of the randomization reaction an acidic material, capable of inactivating the catalyst and of splitting alkali metal soaps, is added. Suitable acidic materials include citric and phosphoric acids. The acid may be added with or without water, and should be in an amount equal to from 1 to 5 equivalents of the alkali metal hydroxide added to the initial fatty ester mixture. The acidic material will serve to split soap present in the mixture to form free fatty acids which dissolve in the oil, and oil-insoluble anhydrous salts of the acid used. The anhydrous salts can be removed by filtration, and the free fatty acids can be removed by conventional refining techniques.

In a preferred embodiment of this invention only enough acidic material is added to the reaction product as will result in the formation of a maximum of 0.7% free fatty acid. Any remaining soap and acid salts formed can be removed by filtration, while the free fatty acid can be removed from the oil during deodorization.

The following specific examples will illustrate the invention with greater particularity:

*Example I*

About 1500 g. of a mixture containing equal parts of refined and bleached palm oil and refined and bleached coconut oil, having a free fatty acid content not greater than 0.1%, was placed in a glass 3-neck flask equipped with a mechanical agitator, vacuum connection, nitrogen sparging, and thermometer. The flask was then heated to a temperature of about 100° C. under an absolute pressure of 10 mm. of mercury, and a mixture containing (a) 0.04% potassium hydroxide, by weight of oil, in a 10 percent aqueous solution and (b) 0.12% glycerine, by weight of oil, was added, with mechanical agitation to aid in homogeneous dispersion. Nitrogen sparging was then started, and the mixture was heated, with continuing agitation at an absolute pressure of 10 mm. of mercury, to from 180° to 190° C. The mixture was held at this temperature for about one hour. It was then cooled to 70° C., and the vacuum was released. 3.0%, by weight of oil, of an aqueous solution of citric acid was added, and the mixture was agitated. (This amount of solution contained 0.12% citric acid, by weight of oil, and was about 2½ equivalents of the amount of potassium hydroxide added at the beginning.) The mixture was allowed to rest until the oil and water phases had separated. The oil was then decanted through a filter.

The solids content of the oil at 70° F. was measured using dilatometric techniques similar to those described by Fulton and associates (Journal of the American Oil Chemists Society, vol. 31, p. 98, 1954). The Solids Content Index of the oil at 70° F. after treatment was 18.7 as compared with a value of 7.5 before treatment. This indicated that the randomization was substantially complete. The free fatty acid content was 0.2%, which was within a range which could be removed by conventional deodorization.

Similar satisfactory randomization can be accomplished by using sodium hydroxide or lithium hydroxide as a catalyst. The same process can also be used with other natural animal, vegetable, and marine oils, and also synthetic glycerides such as have been heretofore described.

Since substantially all of the soap present in the reaction mixture had been converted to free fatty acids, it is obvious that no entrainment of oil would occur on filtration. Thus the free fatty acid content represents practically the entire loss from the randomization process of this invention (about 0.2%). Commercial randomization of the same materials by prior art methods would be expected to result in a loss of about 5%.

As has been heretofore stated, the fatty ester to be randomized by the process of this invention should contain not more than 0.1% free fatty acid. If more than 0.1% free fatty acid is present in the ester subjected to rearrangement, as, for example, when randomizing crude oils, it is very often found that no successful reaction can take place. However, it has been found that if crude oils containing more than 0.1% free fatty acid are refined by the addition of an amount of alkali metal hydroxide sufficient to reduce the free fatty acid content to not more than 0.1%, and are then vacuum dried, the oils will be suitable for use in the process of this invention without the necessity of removing the foots formed. When this procedure is followed prior to rearrangement, unusually small amounts of catalyst can be effectively employed as when the glycerides contain not more than 0.1% free fatty acid.

*Example II*

A rearrangement vessel was charged with a 60,000 pound blend containing about 74% crude tallow and 26% refined and bleached soybean oil. The free fatty acid content of the blend was about 0.4%. 36 pounds of sodium hydroxide was added in the form of a 10% aqueous solution, and the mixture was heated to a temperature between 43° and 55° C. and maintained in this range for about 25 minutes. During this time the mixture was kept under a nitrogen pressure absolute of 23 inches of mercury. Mechanical agitation was used to aid in the dispersion of the hydroxide. At the end of this time the free fatty acid content of the mixture was reduced to less than 0.05%. The mixture was then heated within a temperature range of 49° to 77° C., maintaining the nitrogen pressure. The pressure was then reduced to 0.4 inch of mercury, and held within the temperature range of 49° to 77° C. for about 20 minutes until water present in the mixture had boiled off. 0.05%, by weight, of sodium hydroxide was added in the form of a 10% solution which had been mixed with 0.2% glycerine by weight of the oil. Mechanical agitation was again used. The mixture was heated to a temperature within the range of 160° to 165° C., under a pressure of 2 to 3 inches of mercury absolute for ½ hour. The mixture was cooled down to 65° C. It was then acidulated with 85% food grade phosphoric acid in an amount equal to 1.6 equivalents of the total sodium hydroxide added to the mixture. The mixture was then filtered through a plate and frame filter. About 0.4% free fatty acid remained in the oil, but this was easily removed during subsequent deodorization. The Solids Content Index at 92° F. of the reaction product was 10, as compared to a value of 13 prior to reaction, indicating that substantially complete rearrangement had taken place. In this reaction not all of the soap was converted to free fatty acid. However, the loss of product at the completion of the processing was of the same degree as was noted in the reaction of Example I.

*Example III*

A mixture containing 88% crude lard and 12% refined and bleached soybean oil was rearranged under similar conditions as those used in Example II. Substantially complete randomization was indicated by a Solids Content Index at 70° F. of 10 of the rearrangement as compared to a value of 20 for the mixture prior to reaction. A similar low loss in product was noted as in the preceding examples.

As can be seen by the foregoing, there has been herein described a process for randomizing fatty esters which requires a much smaller amount of catalyst than has heretofore been used. As a result the losses of product in the practice of the process are a fraction of those previously incurred.

What is claimed is:

1. In the process of effecting random molecular rearrangement of fatty triglyceride esters containing not more than 0.1% free fatty acid, the steps of (1) dispersing with agitation in said fatty triglyceride esters from about 0.02% to 0.08% by weight of said esters of alkali metal hydroxide in the form of an aqueous solution containing from 1% to 12% hydroxide, and from about 0.10% to 0.30% by weight of said esters of glycerine, while maintaining said esters at a temperature high enough to melt all solids present but not greater than about 160° C., (2) immediately heating said dispersion to a temperature within the range of 120° C.–200° C. at reduced pressure, thereby removing water, and maintaining the esters within said temperature range until there has been substantial rearrangement of said esters, (3) destroying catalyst present in said rearranged esters by adding an edible acidic material selected from the group consisting of phosphoric acid and citric acid, in an amount equal to 1 to 5 equivalents of alkali metal hydroxide, (4) removing from said esters oil-insoluble material thereby formed, and (5) thereafter removing free fatty acids present in said esters.

2. The process according to claim 1 wherein the alkali metal hydroxide is sodium hydroxide.

References Cited in the file of this patent

UNITED STATES PATENTS

| | | |
|---|---|---|
| 2,309,949 | Gooding | Feb. 2, 1943 |
| 2,442,531 | Eckey | June 1, 1948 |
| 2,588,435 | Van Loon et al. | Mar. 11, 1952 |
| 2,738,278 | Holman et al. | Mar. 13, 1956 |
| 3,079,412 | Chang et al. | Feb. 26, 1963 |